United States Patent [19]

Alibran et al.

[11] Patent Number: 4,701,299

[45] Date of Patent: Oct. 20, 1987

[54] MODULAR LINING FOR ADAPTING THE CONTAINMENT TO THE CORE OF A PRESSURIZED WATER NUCLEAR REACTOR

[75] Inventors: Patrice Alibran, Paris; Jean-Paul Millot, Elancourt; Guy Desfontaines, Puteaux, all of France

[73] Assignee: Framatome & Cie, Courbevoie, France

[21] Appl. No.: 568,465

[22] Filed: Jan. 5, 1984

[30] Foreign Application Priority Data

Jan. 12, 1983 [FR] France .............................. 83 00396

[51] Int. Cl.⁴ .............................................. G21C 9/00
[52] U.S. Cl. ..................................... 376/302; 376/294
[58] Field of Search ............... 376/289, 290, 294, 302, 376/304, 377, 389, 390, 399, 400, 459

[56] References Cited

U.S. PATENT DOCUMENTS

| | | |
|---|---|---|
| 3,124,514 | 3/1964 | Koutz et al. |
| 3,322,639 | 5/1967 | Davidson .......................... 376/289 |
| 3,753,856 | 8/1973 | Ash .................................... 376/302 |
| 4,158,605 | 6/1979 | Cooper, Jr. et al. ............... 376/400 |
| 4,356,062 | 10/1982 | Bosshard .......................... 250/507.1 |
| 4,462,956 | 7/1984 | Boiron et al. ..................... 376/400 |

FOREIGN PATENT DOCUMENTS

| | | | |
|---|---|---|---|
| 0059130 | 9/1982 | European Pat. Off. | |
| 921699 | 3/1963 | United Kingdom ............... 376/304 |
| 1115263 | 5/1968 | United Kingdom ............... 376/289 |

Primary Examiner—Deborah L. Kyle
Assistant Examiner—Richard W. Wendtland
Attorney, Agent, or Firm—Pollock, Vande Sande & Priddy

[57] ABSTRACT

A modular lining for adapting the containment to the core of a pressurized water nuclear reactor, consisting of juxtaposed modular blocks (5) placed between the core containment (1) and the outer surface of the core (3). Arranged between the adjacent faces of the blocks (5), there are thin packing pieces (8) maintaining a certain gap between the undrilled solid blocks (5). The blocks (5) are fixed non-contiguously to the core containment (1) by screw devices (10) cooled by water circulation. The invention applies in particular to pressurized water nuclear reactors of improved efficiency and with a varying neutron spectrum.

9 Claims, 7 Drawing Figures

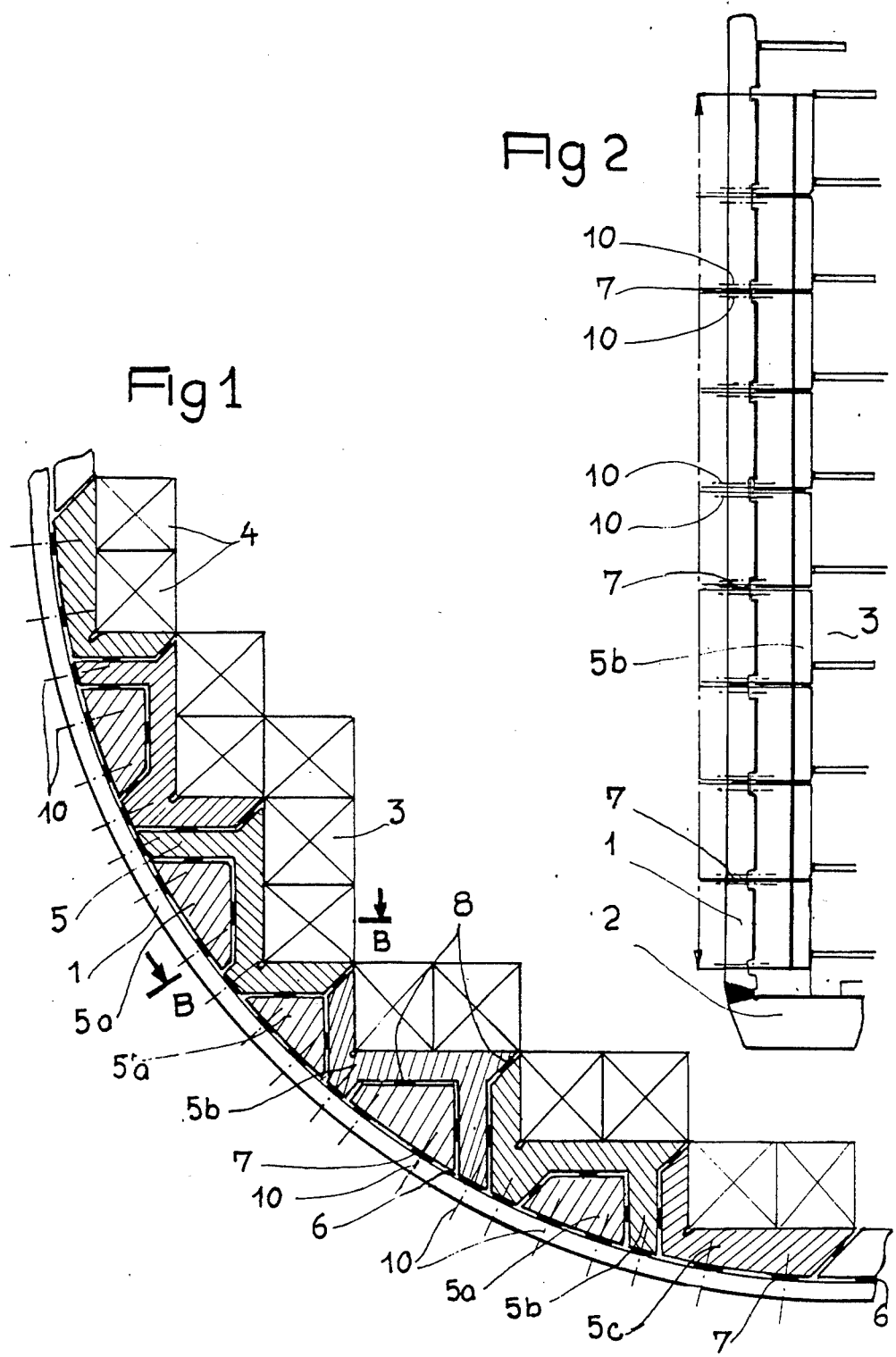

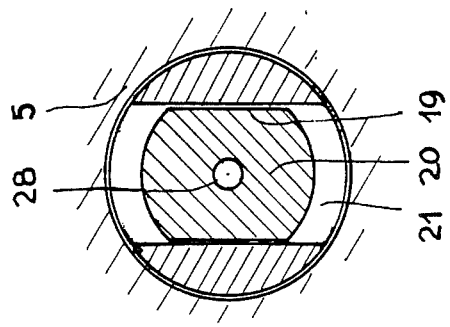
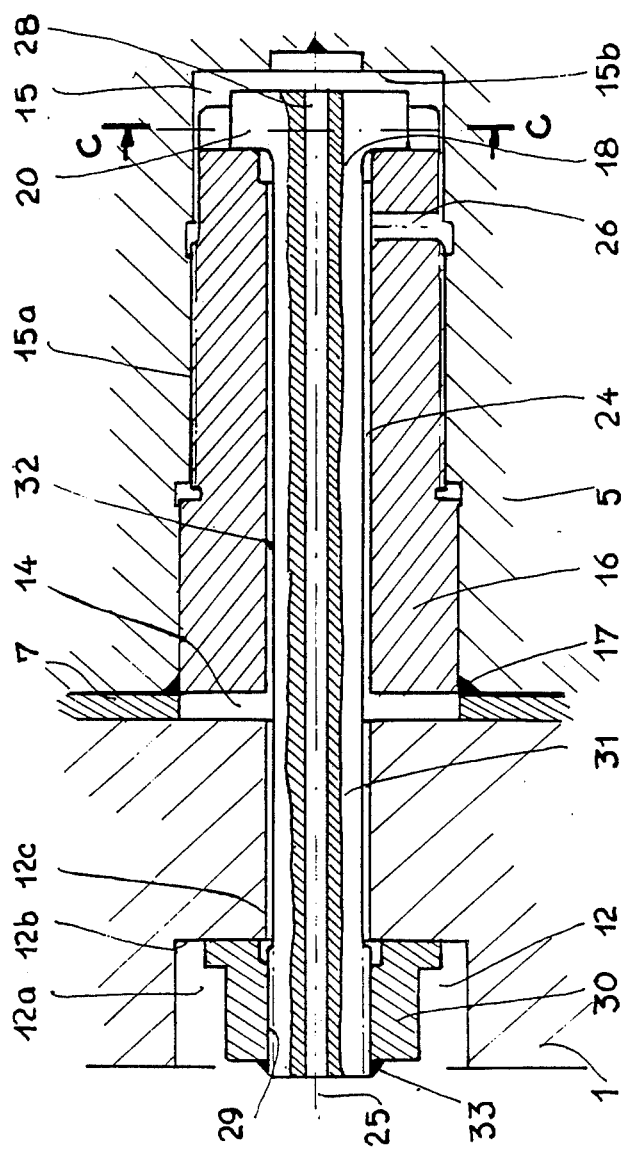

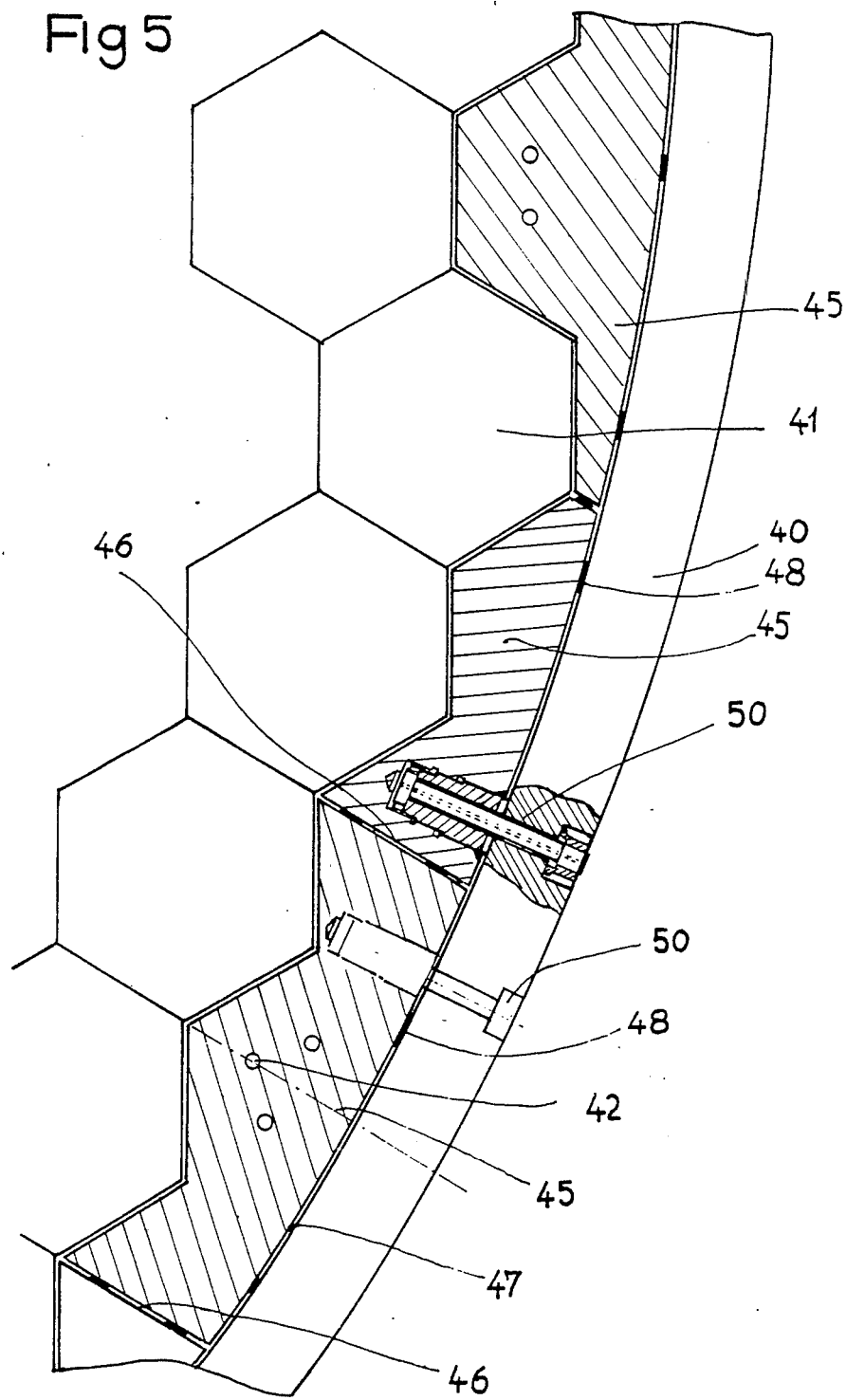

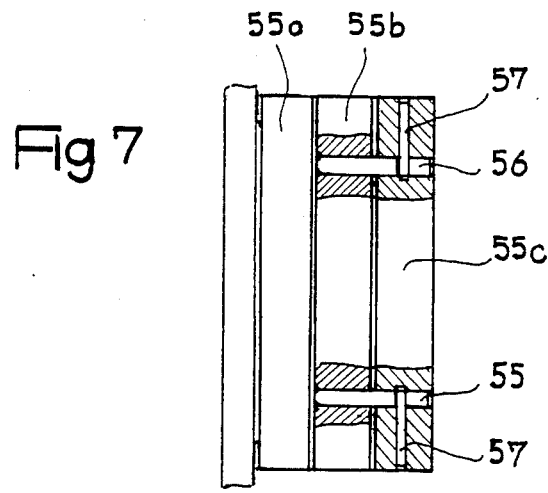
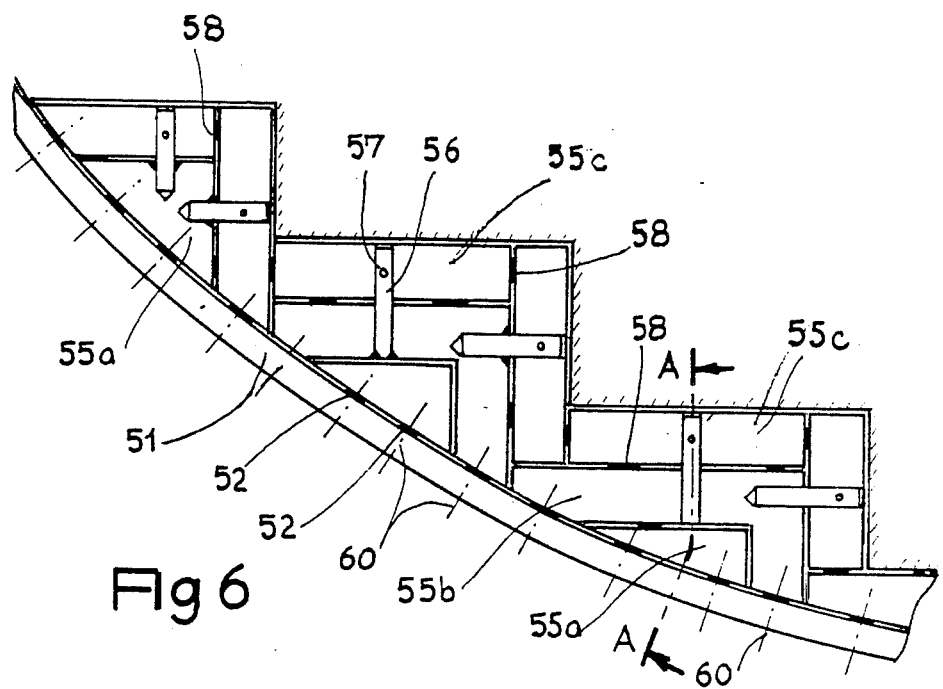

MODULAR LINING FOR ADAPTING THE CONTAINMENT TO THE CORE OF A PRESSURIZED WATER NUCLEAR REACTOR

FIELD ON THE INVENTION

The invention relates to a moldular lining for adapting the containment to the core of a pressurized water nuclear reactor.

BACKGROUND OF THE INVENTION

In pressurized water nuclear reactors, the core generally consists of prismatic assemblies arranged vertically and side by side. The outer surface of the core has a complex shape possessing numerous steps.

Arranged around the core, inside the nuclear reactor vessel, there is a core containment consisting of a cylindrical shell with a vertical axis. Between the outer surface of the core and the inner surface of the core containment, there is an annular region of varying thickness. To hold the reactor core laterally and to channel the greater part of the cooling water flow into the core itself, a modular lining is arranged in this annular region, the said lining consisting of elements joined to one another, some of which can be fixed to the core containment.

This modular lining generally consists of metal plates screwed to one another, some of them being arranged horizontally over the whole width of the annular space, and the others being arranged vertically, in contact with the outer surface of the core.

The horizontal plates, called shape adaptors, are in contact via their outer edge with the inner surface of the core containment and via their inner edge with the outer surface of the core. These shape adaptors are arranged at different levels over the height of the core.

The shape adaptors can be fixed to the core containment by screws inserted in a horizontal bore passing through the core containment and bearing against the core containment with their heads, the shape adaptor possessing a bore in the extension of the bore of the core containment, which is partially tapped to enable screwing the threaded part of the screw.

The temperature of the reactor cooling water is higher inside the core than outside the core containment, because this water heats up in contact with the assemblies in which it circulates from bottom to top, and then, after cooling in the steam generators, returns to the base of the core through the peripheral region of the vessel around the core containment. The core containment is therefore in contact via its outer surface with cooling water at a temperature below the temperature of the water inside the core, and more particularly of the water in the upper part of the core.

The shape adaptors which are in contact both with the core containment and with the vertical plates forming the shield in contact with the outer surface of the core are therefore subjected to substantial thermal gradients. Furthermore, the shape adaptors which are subjected to the radiation emitted by the core are subjected to heating within their bulk. The same applies to the fixing screws. It is therefore necessary to avoid any confined space between the screws and their housing which could lead to vaporization of the water contained in this confined space and to heating and corrosion of the screw.

It is therefore necessary to cool the fixing screws of the shape adaptors and especially to make their temperature uniform.

PRIOR ART

It has been proposed, for example in French Patent No. 2,333,325, to establish a reactor cooling water circuit around the screw. To do this, the bore is provided with sufficiently large dimensions to create a water circulation space around the screw in the shape adaptor, and water inlet and outlet holes are provided in the shape adaptor, communicating with the bore of the screw.

In a modified embodiment, a screw is used which possesses an axial hole over part of its length, communicating, via a lateral hole, with the space created around the screw in the bore of the shape adaptor. Thus, water circulation can be established through the interior of the screw between the outside and the inside of the core containment.

However, this screw cooling process requires special machining of the shape adaptors and can result in mechanical weakening of the fixing screws.

French Patent Application No. 82/18,012, filed by the assignee of the present application, discloses a nuclear reactor of improved efficiency comprising, in particular, a solid modular lining occupying virtually all the volume of the annular space between the core and the core containment.

A solid modular lining of this type, consisting, for example, of stainless steel blocks, can act as a reflector for the fast neutrons in addition to performing the usual functions of modular linings consisting of metal plates joined together.

Furthermore, this solid modular lining makes it possible to protect the vessel from excessively intense neutron bombardment and very substantially to reduce the amount of water in the space between the core and the core containment. This improves the resistance of the modular lining in the event of an accident resulting in a loss of pressurized cooling water.

Moreover, French Patent No. 2,499,752, discloses a solid modular lining consisting of modular blocks stacked on top of one another over the height of the core and firmly fixed to one another by long, vertically arranged ties. The modular blocks are cooled by vertical channels passing through each of the blocks and located in their mutual extension. Keys inserted in grooves on the lateral faces of contacting blocks enable the blocks to be joined together before completing the fixing by means of the ties, to which nuts are fixed at the top part of the core.

This modular lining is not therefore fixed to the core containment, giving rise to disadvantages associated with the fact that the position of the modular lining is not perfectly defined relative to the containment. Furthermore, it is necessary to make a large number of cooling channels in order to limit the stresses and the deformations of thermal origin, which greatly reduces the reflectance of the modular lining. In fact, on the one hand, if the cooling is inadequate, the stack of modular blocks will suffer overall thermal deformation, making it necessary to provide a large clearance between the blocks and the core, which results in starving the peripheral assemblies and maintaining the core less effectively, and on the other hand, in the event of an earthquake, the long ties are subjected to high stresses during the operation of the reactor and are liable to break and separate from the modular lining.

The whole construction is furthermore relatively complex and requires the machining of solid blocks, which must be matched perfectly to one another.

Finally, it is not possible, for solid blocks, to use the method of fixing to the core containment recommended for shape adaptors consisting of relatively thin plates. In fact, for cooling the screws, these devices require holes to be provided in order to bring the bore for the passage of the screws in the shape adaptors into communication with part of the annular space filled with cooling water.

SUMMARY OF THE INVENTION

The object of the invention is therefore to propose a modular lining for adapting the containment to the core of a pressurized water nuclear reactor, which consists of assemblies of prismatic shape, arranged side by side inside a cylindrical core containment with a vertical axis, so as to create an annular space surrounding the core, in which the modular lining is arranged, the said lining consisting of modular metal elements juxtaposed so that the modular lining occupies virtually all the volume of the annular space around the core, inside the core containment, this lining allowing the expansion and the cooling of the modular elements and allowing effective cooling of the screws without it being necessary to provide holes for the passage of water in the modular lining elements, the solid modular lining thus having a high reflectance towards fast neutrons.

For this purpose, arranged between the adjacent faces of the modular elements, there are thin packing pieces maintaining a certain gap between the modular elements consisting of undrilled solid blocks, for their expansion and their cooling, these blocks being fixed non-contiguously to the core containment by screw devices cooled by water circulation.

BRIEF DESCRIPTION OF THE DRAWING

To provide a clear understanding of the invention, several embodiments of a modular lining according to the invention will now be described by way of example.

FIG. 1 shows part of a solid modular lining according to the invention, in a sectional view through a horizontal plane.

FIG. 2 is a section along B—B of FIG. 1.

FIG. 3 is an enlarged view of a screw for fixing the modular lining shown in FIG. 1 to the core containment.

FIG. 4 is a view along C—C of FIG. 3.

FIG. 5 is a sectional view, through a horizontal plane, of part of a solid modular lining according to a second embodiment of the invention.

FIG. 6 is a sectional view, through a horizontal plane, of part of a solid modular lining according to a third embodiment of the invention.

FIG. 7 is a view along A—A of FIG. 6.

DETAILED DESCRIPTION

FIGS. 1 and 2 show the core containment 1 of a pressurized water nuclear reactor, welded at its lower part to the core support plate 2 on which the assemblies forming the reactor core 3 rest. The core containment 1 is fixed at its upper part to the collar of the reactor vessel and arranged co-axially with the vessel. The core containment 1 and the support plate 2 form part of the lower internal equipment of the reactor.

FIG. 1 shows that the outer surface of the core 3 bearing against the modular lining 5 has a complex shape comprising numerous steps corresponding to the peripheral assemblies 4 of the reactor.

The modular lining 5, which occupies virtually all the volume of the annular space between the outer surface of the core and the inner surface of the containment 1, consists of three types of modular element 5a, 5b and 5c of different shapes. All these modular blocks have the same height and the modular lining consists of successive layers of modular elements 5a, 5b and 5c arranged noncontiguously on top of one another over the height of the core. FIG. 2 shows that the modular lining as a whole consists of nine layers of modular elements such as shown in FIG. 1, arranged on top of one another. FIG. 1 also shows that the elements 5a are not all identical to one another and that the same applies to the elements 5b and 5c, which are designed to match the external shape of the core.

The elements 5a, 5b and 5c are arranged along the inner surface of the containment in a non-contiguous manner relative to this containment, packing pieces 7 being arranged between the modular elements and the inner surface of the containment 1. These packing pieces 7 make it possible to create a space 6 for the circulation of the reactor cooling water between the modular lining 5 and the containment 1.

Arranged between the modular elements 5a and 5b and between the elements 5b and 5c, there are also packing pieces 8 making it possible to maintain, under hot conditions, a certain distance between the modular blocks for the circulation of reactor cooling water.

In the cold, there is a small clearance between the packing pieces 8 which are firmly fixed to one of the modular elements (for example 5a), and the adjacent face of the other modular element (for example 5b), which enables the elements 5a and 5b to expand freely within the limit allowed by the clearance, and this reduces the thermal stresses.

This also produces correct cooling of the modular blocks without the need to machine cooling channels and thus with the introduction of only a small amount of water into the modualr lining, which does not lower the reflectance.

Finally, the small size of the modular blocks limits their thermal deformation, which makes it possible to overcome the problems relating to the geometry of the modular lining and aviod the need to provide an excessive clearance between the blocks and the core, which would detract from holding the core in the event of an earthquake and would be liable to result in starving the peripheral assemblies of cooling fluid.

The modular blocks 5a, 5b and 5c are joined to the core containment 1 by means of fixing devices 10, which will be described in detail with reference to FIGS. 3 and 4.

The blocks 5a are joined to the core containment by four devices 10, two of which are arranged at the upper part of the block and two at the lower part. The fixing devices are located in the region of the packing pieces 7. The central block 5a, however, is fixed to the core containment by only two devices 10, one of which is located at its upper part and the other at its lower part.

The modular elements 5b, of profile shape, are joined to the core containment 1 by four screws arranged in pairs on either side of the block 5a, the block 5b which surrounds the block 5a towards the inside bearing against the core containment on either side of this block 5a.

The blocks 5c are also fixed to the core containment by a set of four devices 10.

FIG. 3 shows the core containment 1 through which a bore 12 passes, the said bore comprising a part 12a, of large diameter, towards the outside of the core containment, ending in a bearing surface 12b, and a part 12c of small diameter. The modular lining element 5 joined to the core containment 1 bears against the latter via the packing piece 7 possessing a groove 14 for the passage of water, in communication with the space 6, permitting the circulation of the reactor cooling water between the core containment and the modular blocks. This modular block 5 has a blind hole 15 tapped over a part 15a of its inner surface. A threaded sleeve 16 is screwed inside the blind hole 15 and then locked against rotation relative to the element 5 by a circular weld 17.

Before the sleeve is fixed in the blind hole in the modular block 5, it is equipped with a screw 18 whose head 20, possessing two flat parts 19 visible in FIG. 4, is inserted in a housing 21 machined in the end of the sleeve 16.

The length of the sleeve 16 is less than that of the blind hole 15, with the result that a space is created between the end of the sleeve in which the housing 21 is machined and the bottom 15b of the blind hole 15. The end of the sleeve 16 is hollowed out over a width corresponding to the width of the screw head 20 between the two flat parts 19, in order to create the housing 21. The screw head 20 can thus be locked in rotation when it is inserted in the housing 21 (FIG. 4).

The diameter of the central bore 24 of the sleeve 16 is substantially equal to the diameter of the part 12c of the bore passing through the core containment 1, and when the modular block is placed in the fixing position along the core containment, the bore 12 and the sleeve 16, or its central bore 24, have a common axis 25.

The diameter of the bore 24 and the diameter of the bore 12c are slightly greater than that of the non-threaded part of the screw 18, so that the latter is caused to bend and not to shear, which very substantially improves its fatigue characteristics. For a given screw size, this design makes it possible to make a maximum reduction in the length of the thread and consequently to maximize its bending length, leading to good fatigue characteristics, which are essential since the screws must take up the movements of the blocks resulting from the temperature transitions.

The sleeve 16 has a radial hole 26 passing right through it. Between this hole 26 and that end of the sleeve which is located towards the bottom of the blind hole 15b, the diameter of the sleeve is less than the diameter of the blind hole 15, with the result that an annular space brings the entrance of the radial hole 26 on the outer surface of the sleeve into communication with the space created between the bottom of the blind hole 15b and that end of the sleeve which possesses the housing 21.

The screw 18 has an axial hole 28 over the whole of its length, emerging, when the screw is in place in the sleeve, in the terminal space in the blind hole 15. At its other end, the central hole 28 emerges on the outside of the core containment 15, the screw being inserted in the bore 12 passing through the core containment, so that its end opposite the head 20, having a thread 29, is inside the large diameter 12a of the bore in communication with the outer part of the containment. A nut 30, bearing against the outer surface of the containment, in the region of the bearing surface 12b, is fitted to this threaded part 29.

Between its threaded part 29 and its head 20, the screw comprises a tubular body 31 whose diameter is less than the internal diameter of the part 12c of the bore 12 and of the central bore 24 of the sleeve 16. An annular channel 32 is therefore created around the screw over the whole of its passage through the sleeve 16 inside the block 5 and the containment 1.

To be put in place, the block 5 is brought into a position opposite the packing piece 7 fixed to the inner surface of the core containment, this block 5 being equipped with the sleeve 16 and with the screw 18, which is then inserted in the bore 12 passing through the containment, until the part 29 of this screw reaches the outside of the containment 1. The nut 30 is then screwed on to the part 29 in order to tighten and fix the block 5 against the packing piece 7. This tightening can be carried out since the screw 18 is locked against rotation by its head 20, comprising flat parts 19, in the housing 21.

The same procedure is adopted for the four screws belonging to the four devices 10 for fixing the block 5.

When the tightening has been carried out, the nut is locked against rotation by means of a weld 33.

When the nuclear reactor is operating, there is a pressure difference between the cooling water located outside the containment and the cooling water located inside the containment.

In fact, the water cooled by the steam generators, which is returned to the base of the core through the space existing between the core containment 1 and the vessel, undergoes a pressure drop on passing through the core, which is itself substantially in pressure equilibrium at a given height with the space 6 for the circulation of the cooling water between the core containment and the blocks 5.

There is hence a pressure difference between the outside of the core containment and the groove 14 for the passage of water in communication with the water circulation space 32. A circulation of cooling water is therefore established between the outside and the inside of the core containment through the hole 28 in the screw, the terminal space in the blind hole 15, the annular space between the end of the sleeve 16 and the bottom 15b of the blind hole, the radial hole 26, the annular channel 32 and, finally, the groove 14 for the passage of water.

This continuous circulation of water inside and around the screw makes it possible to avoid thermal gradients in the screw and cools the latter to a certain extent.

This circulation is obtained without it being necessary to make holes in the modular blocks of the lining or to make holes in the screw in the radial direction.

FIG. 5 shows a second type of solid modular lining fixed to the core containment 40 by fixing devices 50 identical to the fixing device shown in FIGS. 3 and 4. This solid modular lining, comprising modular blocks 45, can be used in the case of a pressurized water nuclear reactor of the undermoderated type in which the assemblies 41 have a hexagonal cross-section (instead of a square cross-section as for the reactor shown in FIG. 1).

The various modular blocks 45 are arranged next to one another on the periphery of the core, without overlapping. Some of these blocks have a few vertical cooling holes 42 over their entire height. The number of cooling holes is small in this case, because under-moderated reactors are surrounded by a covering of fertile material arranged between the core and the modular lining, which reduces the heating due to the effect of the radiation on the modular blocks.

As in the case of the modular lining shown in Figures 1 and 2, the modular lining as a whole is made up by the juxtaposition of layers of blocks, as shown in FIG. 5, arranged non-contiguously above one another. Arranged between two successive blocks 45 and between any one block 45 and the core containment 40, there are packing pieces 48 making it possible to create a cooling water circulation space 46 or 47.

FIGS. 6 and 7 show a third type of modular lining which can be used in the case of a core consisting of assemblies of square cross-section, as shown in FIG. 1.

This modular lining comprises modular blocks 55a and 55b fixed to the core containment 51 by fixing devices 60 identical to the devices described with reference to FIGS. 3 and 4.

The modular blocks 55b are arranged so as to overlap with the blocks 55a, and the blocks 55a and 55b are fixed along the containment 51 in a non-contiguous manner by means of packing pieces 52.

Keys 56 are fixed to some of the modular blocks 55a or 55b and are welded to the corresponding modular block and pass right through it. These keys 56 make it possible to fix a third type of modular block 55c to the modular blocks 55a or 55b by means of pins 57.

The modular blocks 55c are not joined directly to the core containment 51, but only via the modular blocks 55a or 55b. Located between the blocks 55a, 55b and 55c, there are packing pieces 58 creating a space for the cooling and the relative movement of the blocks under the effect of expansion.

It is seen that the main advantages of the lining according to the invention are that it permits cooling and relative movement of the blocks under the effect of expansion while avoiding the use of a large number of cooling channels, which reduce the mass of metal in the modular blocks and make them unsuitable as neutron reflectors. The particular type of fixing device described makes it possible to cool the screws for fixing the modular lining elements to the core containment and to make their temperature uniform, to a high degree of efficiency, without reducing the mechanical strength of the screws.

This fixing device can be used in the case of solid modular blocks forming a modular lining occupying virtually all the volume of the annular space between the core and the inner surface of the core containment.

The massive modular linings thus obtained are very firmly fixed to the core containment and have perfectly defined positions.

The arrangement of these modular blocks for forming the modular lining makes it possible to reserve free spaces for the passage of the cooling water, without it being necessary to machine the blocks by drilling.

The invention is not limited to the embodiments which have been described; on the contrary, it includes all the variants thereof.

Thus, solid blocks having shapes different from those which have been described can be used.

The end housing in the sleeve for locking the screw in rotation can have any non-cylindnrical shape in order to make it possible to lock a screw head of the corresponding shape.

The sleeve can be fixed in any manner inside the blind hole created in the modular lining element.

The fixing device described applies not only in the case of a solid reflecting modular lining according to the invention, comprising thick modular blocks, but also in the case of a conventional modular lining consisting of relatively thin metal plates. In this case, the fixing device according to the invention can advantageously be used for fixing the shape adaptors to the core containment.

The invention applies to any pressurized water nuclear reactor for which an improvement in the neutron balance is desired.

What is claimed is:

1. In a water moderated and cooled nuclear reactor having a core with a periphery comprising a plurality of vertically standing adjacent assemblies of prismatic shape and a cylindrical core containment with a vertical axis around said core and separated therefrom by an annular space, a modular lining adapting the containment to the periphery of said core, said lining comprising:
    a plurality of adjacent vertical columns of solid modular blocks having vertical surfaces and occupying substantially the whole volume of said annular sapce, each vertical surface of each of said modular blocks confronting a vertical surface of said core, said core containment, or another of modular blocks,
    localized thin packing pieces separating all mutually adjacent ones of said vertical surfaces which are formed on said modular elements and core containment, said packing pieces being constructed and arranged for maintaining a gap for water flow between said adjacent surfaces, whereby thermal expansion and water cooling are possible,
    and water cooled, threaded means for connection of each of said blocks to said cylindrical containment.

2. The modular lining as claimed in claim 1 wherein each of said blocks is fixed to the core containment by a set of screw devices constituting part of said threaded means.

3. The modular lining as claimed in claim 2, wherein only some of the modular blocks (45) possess holes (42) for the circulation of the reactor cooling water.

4. The modular lining as claimed in claim 8, wherein some of the modular blocks are (55a, 55b) are joined to the core containment (51) by screw devices (60), and the other modular blocks (55c) are each joined to a modular block (55a or 55b), joined to the core containment (51), by means of a key (56) welded to the block (55a or 55b).

5. The modular lining as claimed in any of claims 1, 2, 3 and 4, wherein each of the threaded means for fixing the modular blocks to the core containment comprises:
    a sleeve (16) fixes inside a blind hole (15) machined in the modular block (5), the axis of which is in the extension of the axis of a bore (12) passing through the core containment (1), possessing a central bore (24) of which the diameter is substantially equal to the diameter of the bore (12) passing through the core containment (1), and a non-cylindrical housing (21) into which the central bore (24) emerges at its end located in the region of the bottom of the blind hole (15), the sleeve (16) creating a space with this bottom (15b), and at least one radial hole (26) passing right through its lateral wall, and a screw (18) having an axially directed hole (28) over its entire length and comprising a tubular body (31), the external diameter of which is slightly less than the diameter of the bore (12) of the core containment (1) and of the central bore (24) of the sleeve (16), a head (20), the shape of which matches the shape of the housing (21) machined in the end of the sleeve (16) in which it is inserted, and a threaded part (29) provided with a tightening nut (30), the screw (18) inserted in the central bore (24) of the sleeve (16) and in the bore (12) of the core containment bearing against the sleeve (16) via its head (20) and against the outer surface of the core containment (1) via the nut (30) fitted to its threaded part (29), and the space created between the bottom (15b) of the blind hole and the end of the sleeve (16) communicating with the entrance of the radial hole (26) located on the outer surface of the sleeve (16), with the result that water circulation can be established, during operation, between the outside and the inside of the core containment (1) through the axial hole (28) in the screw (18), the terminal space in the blind hole (15), the radial hole (26) in the sleeve (16) and, finally, the space (32) between the 6. The modular lining as claimed in claim 5, wherein the sleeve (16) is externally threaded so that it can be screwed into a tapped part of the blind hole (15), the sleeve (16) also being locked in rotation by means of a weld (17).

7. In a pressurized water reactor having a pressure vessel, a cylindrical containment envelope in said vessel having a vertical axis and defining with the reactor vessel a path for downward circulation of water, and a core consisting of a plurality of fuel assemblies of prismatic shape arranged vertically and side by side within said containment envelope and cooled by an upward flow of water which has previously circulated along said path, a modular lining which substantially fills an annular space between said containment envelope and said core and constitutes a neutron reflector, comprising:

mutually adjacent solid metal blocks having mutually confronting planar, surfaces separated by a narrow clearance, in continuous mutual abutment through thin spacers which maintain a path for circulation of cooling water which bypasses the upward water flow through the core, those of the blocks which are adjacent to the containment envelope being separated therefrom by additional spacers, thereby defining a narrow path with the envelope for circulation of cooling water, and screw means cooled by an internal flow of water and securing said blocks to said containment envelope.

8. A modular lining as claimed in claim 7, wherein said blocks comprise blocks of a plurality of different types and each of said blocks has part of its lateral surface confronting said containment envelope said part being directly secured to said envelope by said screw means.

9. A modular lining as claimed in claim 7, wherein each of said screw means comprises:

a blind hole formed in the modular block associated with said screw means, sleeve means removably secured in said hole defining an end chamber therewith and formed with an axial bore opening into said chamber, a passage formed in said envelope in alignment with said bore, a screw having a stem projecting through said bore and passage and defining an annular water flow passage between said chamber and said narrow path and a head in abutting connection with said sleeve in said chamber, and nut means threadedly received on said stem and in abutting contact with said envelope, wherein said axial bore, chamber and annular water flow passage constitute a circulation path for said internal flow of water between said path for downward circulation of water and said narrow path.

* * * * *

UNITED STATES PATENT AND TRADEMARK OFFICE
CERTIFICATE OF CORRECTION

PATENT NO.   :   4,701,299
DATED        :   October 20, 1987
INVENTOR(S)  :   ALIBRAN ET AL.

It is certified that error appears in the above-identified patent and that said Letters Patent is hereby corrected as shown below:

Claim 5, line 3, change "fixes" to --fixed-- at end of claim, after "the", add the following:

--screw (18) and the central bore (24) of the sleeve (16), communicating with the space (6) created between the core containment (1) and the modular block (5).--

Signed and Sealed this

Twenty-sixth Day of December, 1989

Attest:

JEFFREY M. SAMUELS

Attesting Officer    Acting Commissioner of Patents and Trademarks